US 11,256,805 B2

(12) United States Patent
Boulton

(10) Patent No.: US 11,256,805 B2
(45) Date of Patent: Feb. 22, 2022

(54) METHOD AND SYSTEM FOR IDENTIFICATION OF SECURE BINARY IMAGES

(71) Applicant: BlackBerry Limited, Waterloo (CA)

(72) Inventor: Adam John Boulton, Wirral (GB)

(73) Assignee: BlackBerry Limited, Waterloo (CA)

( * ) Notice: Subject to any disclaimer, the term of this patent is extended or adjusted under 35 U.S.C. 154(b) by 328 days.

(21) Appl. No.: 16/412,963

(22) Filed: May 15, 2019

(65) Prior Publication Data
US 2020/0364336 A1      Nov. 19, 2020

(51) Int. Cl.
| | |
|---|---|
| *G06F 21/00* | (2013.01) |
| *G06F 21/56* | (2013.01) |
| *G06F 8/75* | (2018.01) |
| *G06F 21/57* | (2013.01) |

(52) U.S. Cl.
CPC ............. *G06F 21/563* (2013.01); *G06F 8/75* (2013.01); *G06F 21/577* (2013.01); *G06F 2221/033* (2013.01)

(58) Field of Classification Search
CPC ...... G06F 21/563; G06F 21/577; G06F 21/10; G06F 21/60; G06F 8/75; G06F 2221/033; H04L 63/1416
See application file for complete search history.

(56) References Cited

U.S. PATENT DOCUMENTS

| | | | | |
|---|---|---|---|---|
| 6,233,678 B1 * | 5/2001 | Bala | .................... | G06F 11/3612 |
| | | | | 712/240 |
| 7,430,670 B1 * | 9/2008 | Horning | .................. | G06F 21/14 |
| | | | | 713/190 |
| 7,757,097 B2 * | 7/2010 | Atallah | ............... | G06F 12/1408 |
| | | | | 713/187 |
| 7,779,270 B2 * | 8/2010 | Horning | ................ | G06F 21/125 |
| | | | | 713/187 |
| 9,064,099 B2 * | 6/2015 | Horning | .................. | G06F 21/14 |
| 9,448,788 B1 * | 9/2016 | Barua | ....................... | G06F 8/70 |
| 10,255,414 B2 * | 4/2019 | Horning | .................. | G06F 21/14 |
| 2019/0121718 A1 | 4/2019 | McCourt et al. | | |

OTHER PUBLICATIONS

European Patent Office, Extended European Search Report on Application No. 20171217.1 dated Sep. 25, 2020.
Martin P. Robillard et al., "Static analysis to support the evolution of exception structure in object-oriented systems", ACM Transactions on Software Engineering and Methodology, Association for Computing Machinery, New York, US, vol. 12, No. 2, Apr. 1, 2003, pp. 191-221, XP058184562.
Liu Jinshuo et al., "The Evaluation off the Embedded Software Quality Based on Binary Code", 2016 IEEE International Conference on Software Quality, Reliability and Security Companion (QRS-C), IEEE, Aug. 1, 2016, pp. 167-170, XP032969555.

* cited by examiner

*Primary Examiner* — Hosuk Song
(74) *Attorney, Agent, or Firm* — Moffat & Co

(57) ABSTRACT

A method at a computing device for identification of secure binary images, the method including: dissecting a binary image into routines and functions; disassembling byte code for the dissected routines and functions; retrieving local routine and function parameters; counting a number of conditional routines for each local routine and function parameter; and creating a confidence score for each dissected routine and function.

17 Claims, 4 Drawing Sheets

METHOD AND SYSTEM FOR IDENTIFICATION OF SECURE BINARY IMAGES

FIELD OF THE DISCLOSURE

The present disclosure relates to analyzing binary software components, and in particular relates to determining the quality of a binary application by analyzing the binary software components.

BACKGROUND

Poor quality software, or in other words software having a low level of robustness, can lead to critical faults, security breaches, software failures, among other problems. Use of such software in a system presents a risk to the entire system.

Binary static analysis involves examination of a compiled or binary representation of a software program and inferring various functionalities without actually executing the program. Disassembling a binary software program can include translating the compiled or binary representation of the program into assembly language.

BRIEF DESCRIPTION OF THE DRAWINGS

The present disclosure will be better understood with reference to the drawings, in which.

DETAILED DESCRIPTION OF THE DRAWINGS

Figure 1:
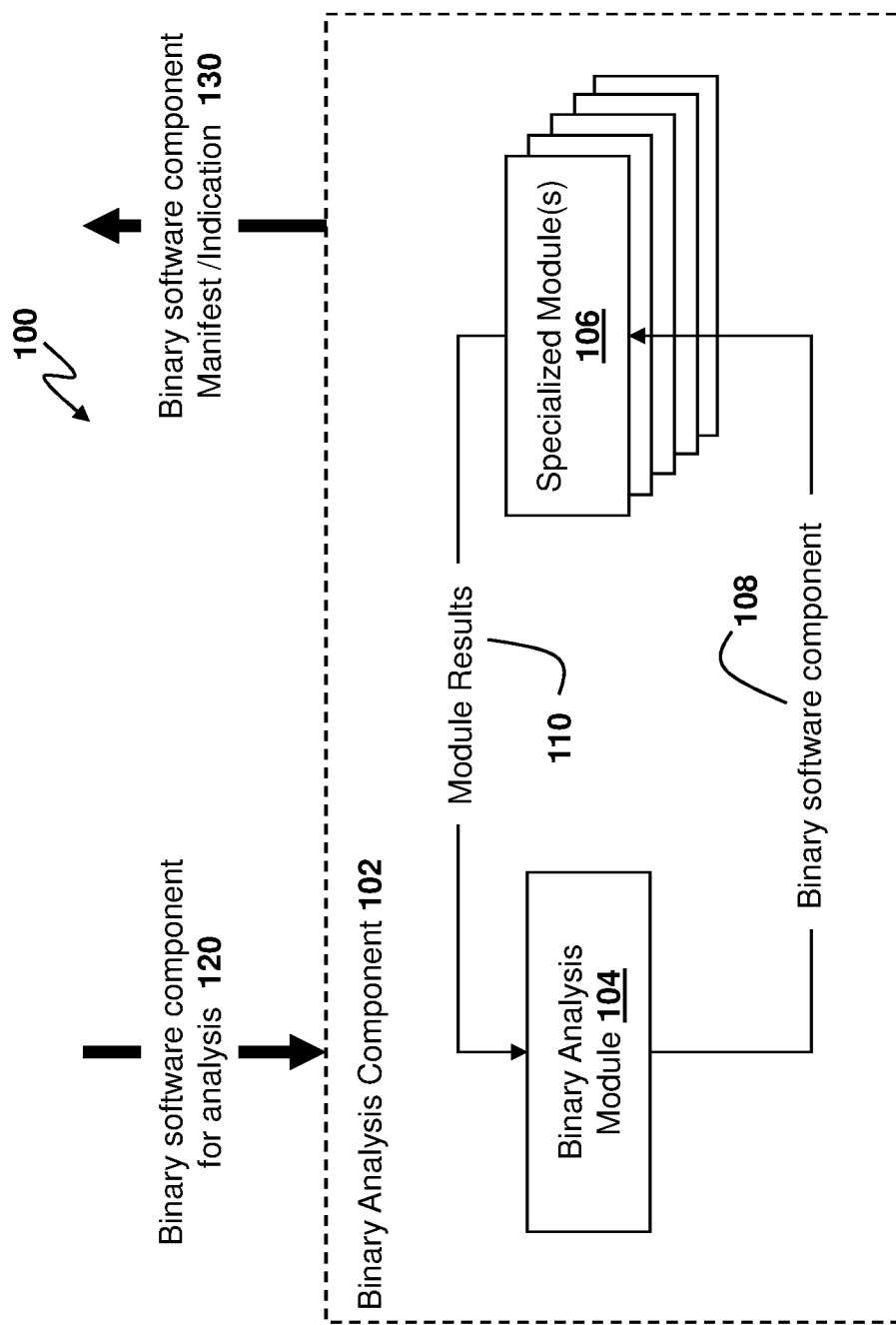
FIG. 1 is a block diagram of a system for performing static analysis of a binary image.

The present disclosure provides a method at a computing device for identification of secure binary images, the method comprising: dissecting a binary image into routines and functions; disassembling byte code for the dissected routines and functions; retrieving local routine and function parameters; counting a number of conditional routines for each local routine and function parameter; and creating a confidence score for each dissected routine and function.

The present disclosure further provides a computing device for identification of secure binary images, the computing device comprising: a processor; and a communications subsystem, wherein the computing device is configured to: dissect a binary image into routines and functions; disassemble byte code for the dissected routines and functions; retrieve local routine and function parameters; count a number of conditional routines for each local routine and function parameter; and create a confidence score for each dissected routine and function.

The present disclosure further provides a computer readable medium for storing instruction code for identification of secure binary images, the instruction code when executed by a processor of a computing device, causing the computing device to: dissect a binary image into routines and functions; disassemble byte code for the dissected routines and functions; retrieve local routine and function parameters; count a number of conditional routines for each local routine and function parameter; and create a confidence score for each dissected routine and function.

Knowing if a binary application is of a certain quality is difficult to determine, yet something that may be advantageous to know before executing the binary application. In particular, it may be beneficial to ascertain the level of quality of the application in terms of high levels of robustness, since high levels of robustness relate to more secure and safe systems. As used herein, robustness denotes whether errors are avoided or handled by the application, rather than the software raising exceptions and perhaps transitioning to an unstable state.

In this regard, the present disclosure ascertains a confidence score for a piece of software, and in some cases for the functions or routines within the piece of software. The confidence score indicates whether an application is permitted to be executed on the system or computing device. Through analysis of binary applications, a knowledge of secure software agile craftsmanship and analysis of ultra-reliable components allows for determination on how a binary image should conform to a secure model and how the present binary image deviates from what is safe and secure.

The analysis of a binary image can be done for any component or system.

Further, some software may be required to have higher confidence scores. For example, system critical routines or software may be required to have a higher confidence score. Such system critical routines may include drivers that need to be very solid and robust on a kernel, whereas a user application may be permitted to have a lower confidence score and still run.

In the present disclosure, the binary images being analysed relate to an automotive environment. However, this is provided merely for illustration and the present disclosure could equally be used with any software system or binary image, regardless of the purpose of the software system or binary image.

Using the example of an automotive system, a modern vehicle may have over 100 million lines of software code. As software in a vehicle grows, so does a potential for critical errors or faults, which can lead to systems failing, or may lead to a large attack surface, which makes such software vulnerable to attacks. Each poorly constructed piece of software represents a potential vulnerability.

Methods and systems are provided herein which may analyse software within a system to detect how robust functions and routines within the software image are. For example, static analysis may be performed on the binary code within a system. Through binary static analysis, a range of characteristics and attributes for a given software image may be determined. As used herein, a software image comprises binary code which was compiled from source code, and is thus not readily readable by a person.

Binary static analysis allows binary software components to be analyzed without referring to the high-level source code from which the binary software component was compiled. Binary static analysis is performed by examining the content and structure of the binary data making up the binary software component. Using these techniques, characteristics of the binary software component can be identified, including, but not limited to, functions defined in the program, application programming interfaces (APIs) used by the program, compiler defensive techniques implemented in the functions defined in the program, conditional checks, bounds checks, and other characteristics of the binary software component. Due to the general unavailability of corresponding high-level source code to users of binary software components, analyzing the complexity of a binary software component using binary static analysis would allow users to more easily evaluate the likelihood of bugs, failures, and logic errors occurring during execution of the binary software component.

Binary software components are binary files including instructions to be executed by a processor. A binary software component may be generated from a set of source code by a compiler program, which translates the source code into instructions specific to a particular processor (e.g., INTEL CORE I7) or processor architecture (e.g., ARM). The binary software component may include a number of code blocks that equate roughly to functions defined in source code.

Generally, file formats used to encode binary software components (e.g., Executable and Linkable Format (ELF)) indicate areas of the file where executable code resides, but they do not indicate the locations of individual functions and data. In some cases, it may be possible to identify functions by using a symbol table encoded in the file. This table, however, may not contain references to all functions and in some cases may not be included in the file. A map identifying the start and end locations of functions, as well as data components for the function, may be used to perform a binary static analysis on the binary software component.

In addition, binary software components compiled for some processor architectures (e.g., ARM) may contain a mixture of instruction sets. For example, a binary software component compiled for the ARM architecture may include instructions from the ARM 32-bit instruction set, as well as instructions from the THUMB 16-bit instruction set. In some cases, a binary software component may not include any indication regarding which code blocks use which instruction set.

In other cases, binary static analysis may involve examining a binary software component for other vulnerabilities. For example, the robustness of the software can be analysed. In particular, routines which obtain data from external sources may need to be encapsulated in an exception capture mechanism such as a "try . . . catch" routine. Other exception handling mechanisms may also be found within a software image. In other cases, variables may need to be checked prior to use of such variables. For example, if a local variable is used in a routine, this variable may be checked to determine that it is not NULL prior to use of the variable. In other cases, a return value from a function could be checked prior to using the return value to ensure a NULL value was not returned. In other cases, a check may be used to determine that the variable is within a range or is of a type expected. Other examples of robustness checking would be evident to those skilled in the art. If such checking is not present then this may indicate that the function, routine or software is not robust.

In still further cases, the complexity characteristics of a piece of code may be analysed to look for potential vulnerabilities.

In still further cases, other vulnerabilities may be considered during a binary static analysis, and the present disclosure is not limited to any particular analysis performed during a binary static analysis.

FIG. 1 provides additional details for the performance of a binary static analysis. FIG. 1 is a schematic diagram showing a system 100 that identifies different characteristics or vulnerabilities within a binary software component using binary static analysis, according to one embodiment. The system 100 includes a binary analysis component 102, which can include a binary analysis module 104 and one or more specialized modules 106. The binary analysis component 102 can include a system for performing binary static analysis on software components to generate a manifest or indication 130 including characteristics or potential vulnerabilities of the binary software component determined during the analysis. The binary analysis component 102 can include one or more computing devices executing software programs, such as the binary analysis module 104 and the one or more specialized modules 106, to perform portions of the analysis of software components.

For example, specialized modules 106 may include one or more of, but are not limited to, a stack cookie detector to detect whether cookies are being placed on a stack; a binary mapper module to map the various binary components to a particular processor or instruction set; a complexity analysis module to determine complexity characteristics within the binary code; a message ID filter identification module to find message identifiers that a node will accept, a confidence module for finding how robust the software component is, among other options.

In an example operation, the binary analysis component 102 can receive a binary software component 120 for analysis. The source of the binary software component can be, for example, a software build environment, a software deployment manager, or an executable file (not shown). The binary analysis module 104 of the binary analysis component 102 can perform binary static analysis on the binary software component. In some cases, the binary analysis module 104 performs this analysis utilizing module results 110 generated by the one or more specialized modules 106. The binary analysis module may provide the binary software component (or a reference to it) to the one or more specialized modules 106, as for example shown with binary software component 108. The one or more specialized modules 106 may perform various functionality based on the type of module and the purpose of the module.

In some implementations, the module results 110 may include information about program sections (e.g., functions, data structures) included in the binary software component, including, but not limited to, an instruction set utilized by the program section, a starting location of the program section within the binary software component, an ending location of the program section within the binary software component, or other information. The binary analysis module 104 may use the module results 110 to perform the binary static analysis of the binary software component. For example, the binary analysis module 104 may iterate through each program section in a software map, and begin its analysis at the specified starting location within the binary software component. The binary analysis module 104 may also use the instruction set specified for the function in the module results 110 to disassemble the instructions for each program section during its analysis of the binary software component.

In one case, the specialized modules 106 may include a module used to identify robustness of a software component within the binary image for a computing node such as an ECU within a vehicle. In particular, as described below, various types of conditional checks and exception handling routines can be present or absent within the software component, and the presence or absence of such checks or exception handling routines can be indicative of how robust the software is, allowing a confidence score to be assigned to the software component.

Figure 2:
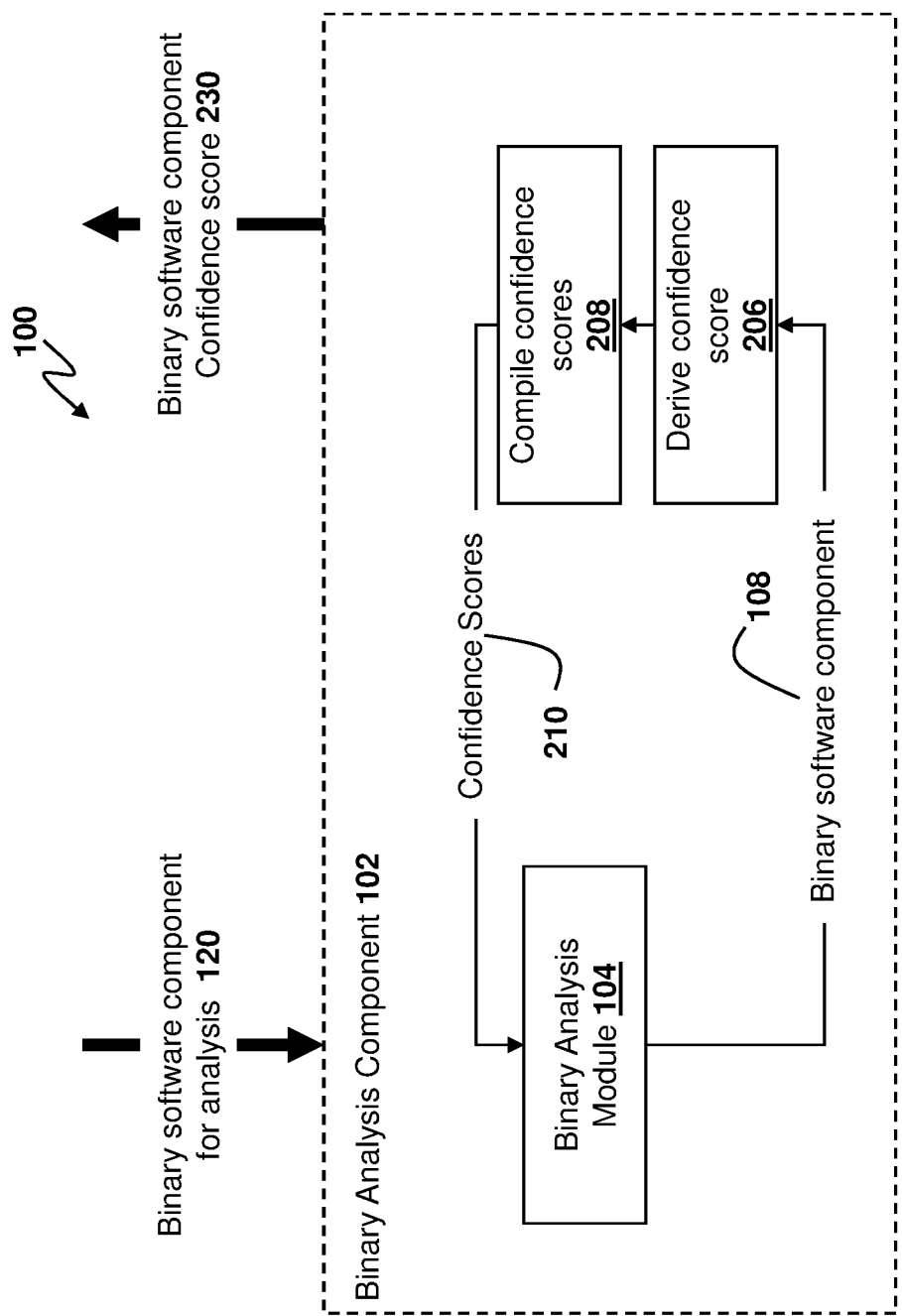
FIG. 2 is block diagram of system for finding message identifier filters within a binary image.

Reference is now made to FIG. 2, which shows a specific confidence score derivation module 206 as being part of the a binary analysis component 102. Similar reference numerals to those provided above with regard to FIG. 1 are used in FIG. 2 for similar elements.

In particular, for each software module, the binary analysis component 102 may receive a binary software component for analysis, shown with reference numeral 120.

The binary analysis component 102 utilizes a binary analysis module 104 which may send the binary software component 108 to confidence score derivation module 206. The confidence score derivation module 206 may then provide a confidence score for that binary software component 108 to a compilation module 208. The compilation module 208 may then provide compiled confidence scores, shown with message 210, back to the binary analysis module 104.

Once the confidence scores have been derived and compiled, the process may return the binary software component confidence scores 230.

Derivation of Confidence Scores

In accordance with one embodiment of the present disclosure, a confidence score may be derived based on various conditional checking and bounds checking within a software component. In some cases, the confidence score may be a weighted score depending on the functionality or purpose of the software component. In other words, a confidence score may be weighted differently in cases where the software component could have more functionality go wrong. For example, an application program interface (API) may be weighted differently than a mathematical routine. Other examples are possible.

Figure 3:
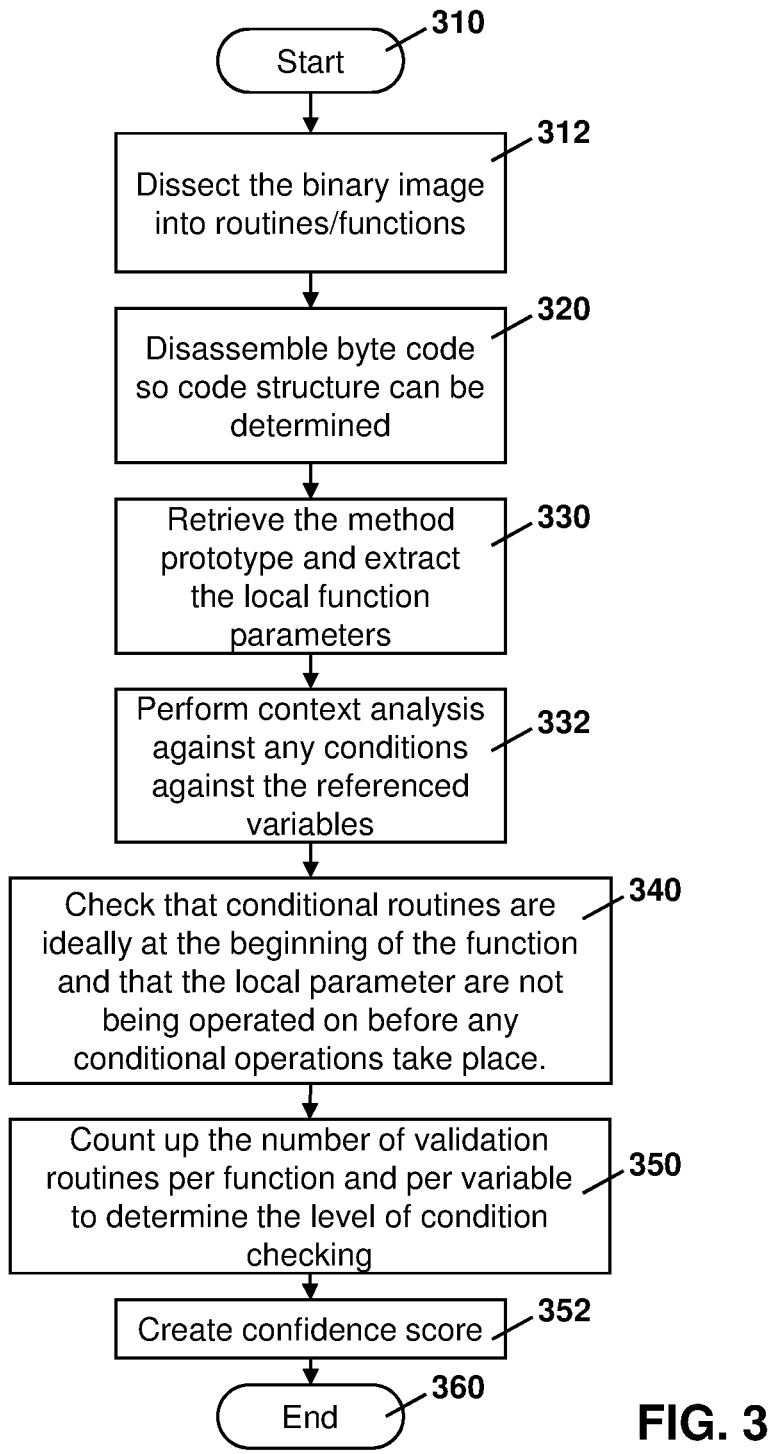
FIG. 3 is a process diagram showing the derivation of a confidence score for a binary image or binary software component.

In this regard, reference is now made to FIG. 3. FIG. 3 shows a process for creating a confidence score and starts at block 310. From block 310, the process proceeds to block 312 in which the binary image may be dissected into routines or functions.

The process then proceeds to block 320 in which the byte code may be disassembled so that the code structure may be determined. From block 320, the process proceeds to block 330 in which the method prototype is retrieved and the local function parameters are extracted for each function or routine.

The process then proceeds to block 332 in which context analysis may be performed against any conditions against the reference variables. The process of block 332 is an indicator of validation being applied to the application data. Some instructions are more indicative of bounds checking.

For example, conditional routines may include a "try . . . catch" exception handling routine. Thus, the process of block 332 could determine whether the functions which require input from external sources are within such exception handling block. In other cases, the process of block 332 could determine whether or not variables are checked for values prior to being used. In other cases, the process of block 332 could check that potential exceptions within the execution of the code would be properly handled and not cause the entire software routine to crash. Other options for handling of conditional routines are possible.

The process may then proceed to block 340 in which a check is made to determine that the conditional routines are generally at the beginning of the function and that local parameters are not being operated on before any conditional operations take place. Specifically, the error checking should occur prior to use of the variables in most cases.

From block 340, the process proceeds to block 350 in which the number of validation routines per function are counted and the number of validation routines per variable are counted to determine a level of condition checking From the results of block 340, a weighted score for the binary image or component may be created and translated into a confidence score showing the reliability of the module. The weighting may be based on the type of routine or function being analysed. For example, an application program interface may be weighted more than a mathematical routine since more could go wrong. Therefore, the context behind the function or routine may be considered in weighting the confidence score. For example, functions or routines dealing with memory access, network-based access, among others could have a requirement for more checking and therefore the confidence score could be weighted based on this.

The derived confidence score provides a level of risk that the execution of a piece of software would have on the system. In some cases, a threshold may be set which will be compared to the derived confidence score in order to determine whether the software could be executed on the system. In some cases, the threshold may change based on what the software is being used for. For example, system critical components such as a brake controller may require a higher confidence threshold in order to run then a user application such as an email application. In the case of the failure of an email application, typically the software application may be shut down but would not cause any potential safety issues. Conversely, the failure of a brake controller may jeopardize the occupants of the vehicle.

Based on the above, the process at block 352 classifies components and provides a weighted conference score to find software components that need more attention or need clarification on why conditional checking is not being performed within that routine.

From block 352, the process proceeds to block 360 and ends.

As will be appreciated by those in the art, a low confidence score for a piece software may cause certain actions to take place. In some cases, the software may not be permitted to run on a system due to the level of risk. In other cases, the low confidence score may be provided back to the supplier or manufacturer of the component or software system and a clarification on why the software is not robust may be requested. In other cases, alternate software components, if available, may be used or sourced. Other options for actions are possible.

While the examples above are provided for vehicle systems, the analysis of software robustness can be done in any system. For example, the analysis may be performed on medical equipment, Internet of things devices, applications within an application store such as the Google™ App Store™ or the Apple™ App Store™, among other options.

A server performing the analysis from FIGS. 1 to 3 may be any computing device, network node or element, or may be a combination of computing devices, network nodes or elements. For example, one simplified server that may perform the embodiments described above is provided with regards to FIG. 4.

Figure 4:
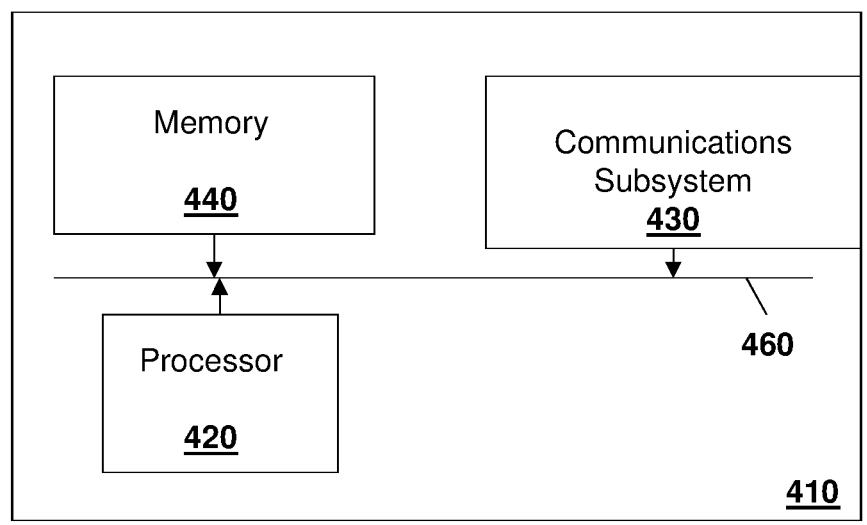
FIG. 4 is a block diagram of an example computing device or server capable of being used with the embodiments of the present disclosure.

In FIG. 4, server 410 includes a processor 420 and a communications subsystem 430, where the processor 420 and communications subsystem 430 cooperate to perform the methods of the embodiments described herein.

The processor 420 is configured to execute programmable logic, which may be stored, along with data, on the server 410, and is shown in the example of FIG. 4 as memory 440. The memory 440 can be any tangible, non-transitory computer readable storage medium, such as DRAM, Flash, optical (e.g., CD, DVD, etc.), magnetic (e.g., tape), flash drive, hard drive, or other memory known in the art. In one embodiment, processor 420 may also be implemented entirely in hardware and not require any stored program to execute logic functions.

Alternatively, or in addition to the memory 440, the server 410 may access data or programmable logic from an external storage medium, for example through the communications subsystem 430.

The communications subsystem 430 allows the server 410 to communicate with other devices or network elements.

Communications between the various elements of the server 410 may be through an internal bus 460 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products. In some cases, functions may be performed entirely in hardware and such a solution may be the functional equivalent of a software solution.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide communication to an electronic device. For example, rather than a typical server response, the server may also provision or indicate data for a content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

In particular, the present disclosure may include the embodiments of the following clauses:

AA. A method at a computing device for identification of secure binary images, the method comprising: dissecting a binary image into routines and functions; disassembling byte code for the dissected routines and functions; retrieving local routine and function parameters; counting a number of conditional routines for each local routine and function parameter; and creating a confidence score for each dissected routine and function.

BB. The method of clause AA, wherein the confidence score is weighted based on a purpose for the dissected routine or function.

CC. The method of claim BB, wherein a higher weight is assigned if the function accesses memory or network resources.

DD. The method of any one of clauses AA to CC, wherein the counting further comprises determining that the conditional routine occurs near a beginning of the dissected routine or function.

EE. The method of any one of clauses AA to DD, wherein conditional routines include exception handling routines.

FF. The method of any one of clauses AA to EE, wherein conditional routines include parameter checking prior to using a parameter.

GG. The method of clause FF, wherein the parameter checking finds whether a parameter has a null value or is of an unexpected type or value.

HH. The method of any one of clauses AA to GG, further comprising checking the confidence score against a threshold to determine whether the software should be allowed to run on a system.

II. The method of clause HH, wherein the threshold varies based on a purpose for the system.

JJ. The method of any one of clauses AA to II, wherein the confidence score for each dissected routine and function is averaged to provide a confidence score for the binary image.

KK. A computing device for identification of secure binary images, the computing device comprising: a processor; and a communications subsystem, wherein the computing device is configured to: dissect a binary image into routines and functions; disassemble byte code for the dissected routines and functions; retrieve local routine and function parameters; count a number of conditional routines for each local routine and function parameter; and create a confidence score for each dissected routine and function.

LL. The computing device of clause KK, wherein the confidence score is weighted based on a purpose for the dissected routine or function.

MM. The computing device of clause LL, wherein a higher weight is assigned if the function accesses memory or network resources.

NN. The computing device of any one of clauses KK to MM, wherein the computing device is configured to count by determining that the conditional routine occurs near a beginning of the dissected routine or function.

OO. The computing device of any one of clauses KK to NN, wherein conditional routines include exception handling routines.

PP. The computing device of any one of clauses KK to OO, wherein conditional routines include parameter checking prior to using a parameter.

QQ. The computing device of clause PP, wherein the parameter checking finds whether a parameter has a null value or is of an unexpected type or value.

RR. The computing device of any one of clauses KK to QQ, wherein the computing device is further configured to check the confidence score against a threshold to determine whether the software should be allowed to run on a system.

SS. The computing device of clause RR, wherein the threshold varies based on a purpose for the system.

TT. The computing device of any one of clauses KK to SS, wherein the confidence score for each dissected routine and function is averaged to provide a confidence score for the binary image.

UU. A computer readable medium for storing instruction code for identification of secure binary images, the instruction code when executed by a processor of a computing device, causing the computing device to: dissect a binary image into routines and functions; disassemble byte code for the dissected routines and functions; retrieve local routine and function parameters; count a number of conditional routines for each local routine and function parameter; and create a confidence score for each dissected routine and function.

VV. The computer readable medium of clause UU, wherein the confidence score is weighted based on a purpose for the dissected routine or function.

WW. The computer readable medium of clause VV, wherein a higher weight is assigned if the function accesses memory or network resources.

XX. The computer readable medium of any one of clauses UU to WW, wherein the computing device is caused to count by determining that the conditional routine occurs near a beginning of the dissected routine or function.

YY. The computer readable medium of any one of clauses UU to XX, wherein conditional routines include exception handling routines.

ZZ. The computer readable medium of any one of clauses UU to YY, wherein conditional routines include parameter checking prior to using a parameter.

AAA. The computer readable medium of clause ZZ, wherein the parameter checking finds whether a parameter has a null value or is of an unexpected type or value.

BBB. The computer readable medium of any one of clauses UU to AAA, wherein the computing device is further caused to check the confidence score against a threshold to determine whether the software should be allowed to run on a system.

CCC. The computer readable medium of clause BBB, wherein the threshold varies based on a purpose for the system.

DDD. The computer readable medium of any one of clauses UU to BBB, wherein the confidence score for each dissected routine and function is averaged to provide a confidence score for the binary image.

The invention claimed is:

1. A method at a computing device for identification of secure binary images, the method comprising:
   dissecting a binary image into routines and functions;
   disassembling byte code for the dissected routines and functions;
   retrieving local routine and function parameters;
   counting a number of conditional routines for each local routine and function parameter; and
   creating a confidence score for each dissected routine and function;
   wherein the confidence score is weighted based on a purpose for the dissected routine or function, the confidence score being weighted more heavily when the dissected routine or function accesses memory or network resources.

2. The method of claim 1, wherein the counting further comprises determining that the conditional routine occurs near a beginning of the dissected routine or function.

3. The method of claim 1, wherein conditional routines include exception handling routines.

4. The method of claim 1, wherein conditional routines include parameter checking prior to using a parameter.

5. The method of claim 4, wherein the parameter checking finds whether a parameter has a null value or is of an unexpected type or value.

6. The method of claim 1, further comprising checking the confidence score against a threshold to determine whether the software should be allowed to run on a system.

7. The method of claim 6, wherein the threshold varies based on a purpose for the system.

8. The method of claim 1, wherein the confidence score for each dissected routine and function is averaged to provide a confidence score for the binary image.

9. A computing device for identification of secure binary images, the computing device comprising:
   a processor; and
   a communications subsystem, wherein the computing device is configured to:

dissect a binary image into routines and functions;
disassemble byte code for the dissected routines and functions;
retrieve local routine and function parameters;
count a number of conditional routines for each local routine and function parameter; and
create a confidence score for each dissected routine and function;
wherein the confidence score is weighted based on a purpose for the dissected routine or function, the confidence score being weighted more heavily when the dissected routine or function accesses memory or network resources.

10. The computing device of claim 9, wherein the computing device is configured to count by determining that the conditional routine occurs near a beginning of the dissected routine or function.

11. The computing device of claim 9, wherein conditional routines include exception handling routines.

12. The computing device of claim 9, wherein conditional routines include parameter checking prior to using a parameter.

13. The computing device of claim 12, wherein the parameter checking finds whether a parameter has a null value or is of an unexpected type or value.

14. The computing device of claim 9, wherein the computing device is further configured to check the confidence score against a threshold to determine whether the software should be allowed to run on a system.

15. The computing device of claim 14, wherein the threshold varies based on a purpose for the system.

16. The computing device of claim 9, wherein the confidence score for each dissected routine and function is averaged to provide a confidence score for the binary image.

17. A non-transitory computer readable medium for storing instruction code for identification of secure binary images, the instruction code when executed by a processor of a computing device, causing the computing device to:
dissect a binary image into routines and functions;
disassemble byte code for the dissected routines and functions;
retrieve local routine and function parameters;
count a number of conditional routines for each local routine and function parameter; and
create a confidence score for each dissected routine and function;
wherein the confidence score is weighted based on a purpose for the dissected routine or function, the confidence score being weighted more heavily when the dissected routine or function accesses memory or network resources.

* * * * *